Patented July 31, 1934

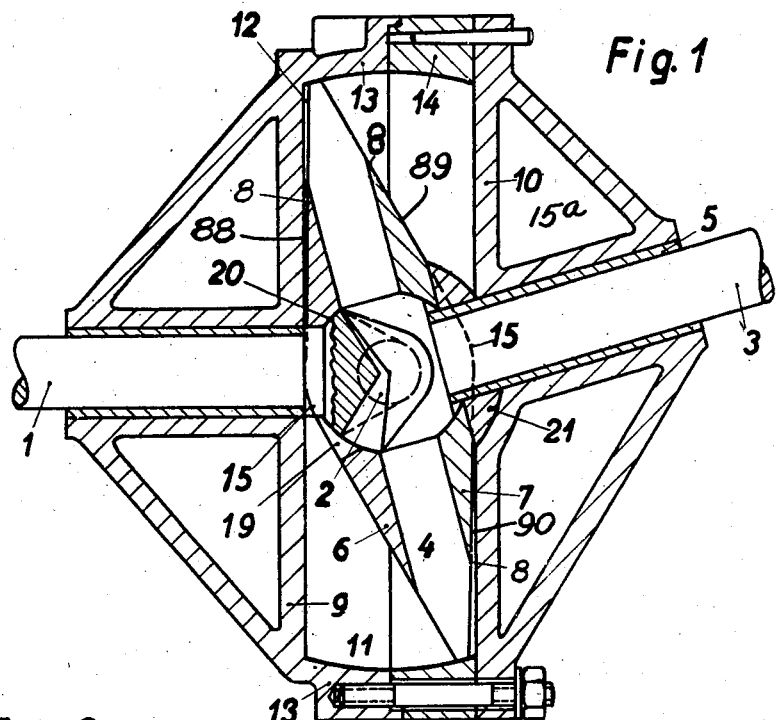
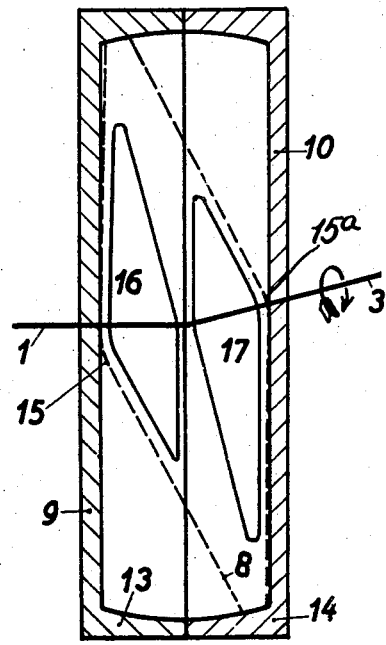
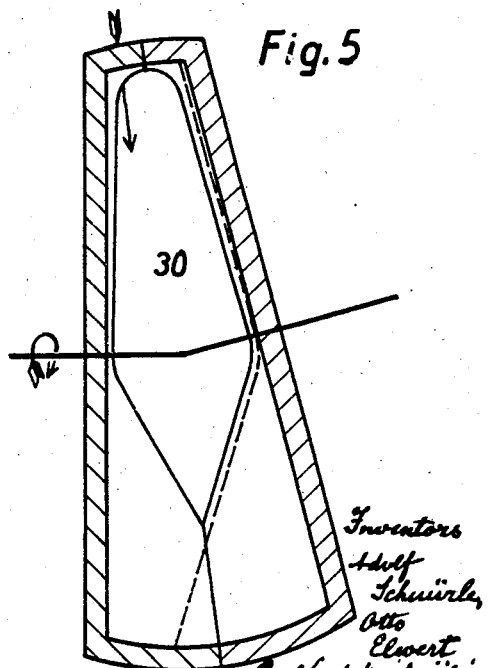

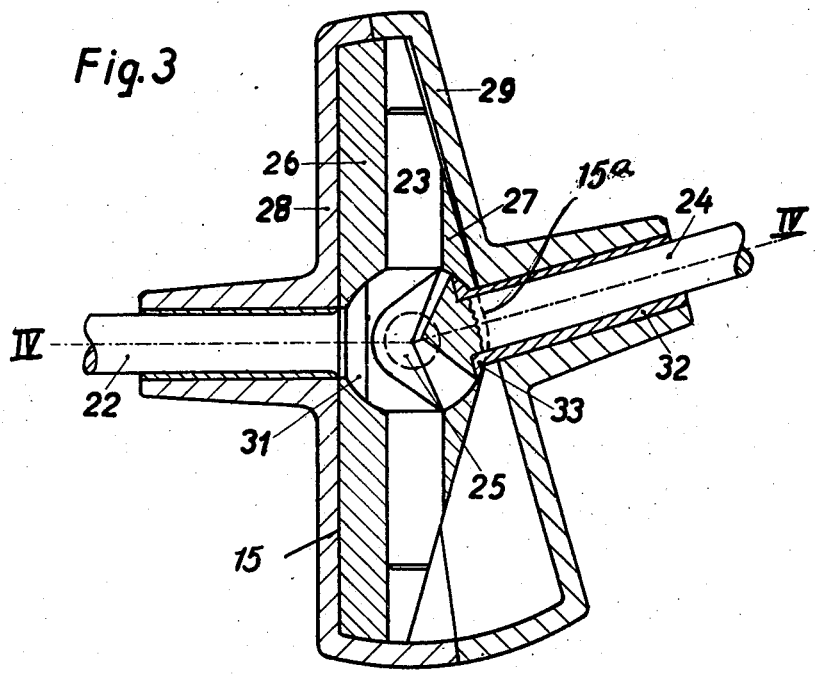
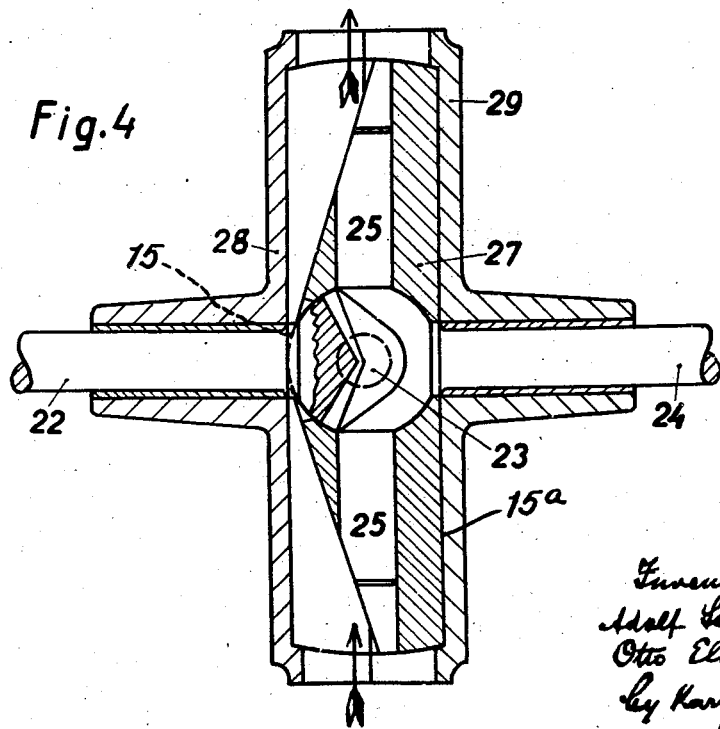

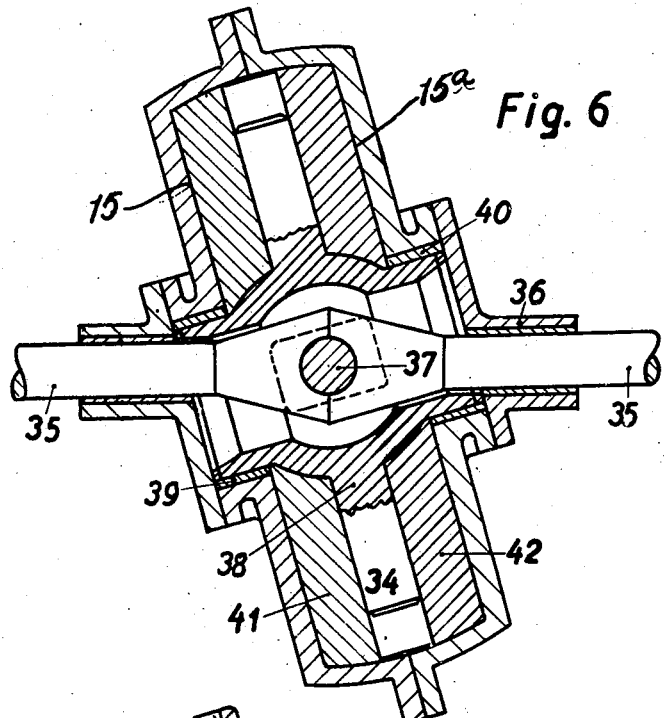
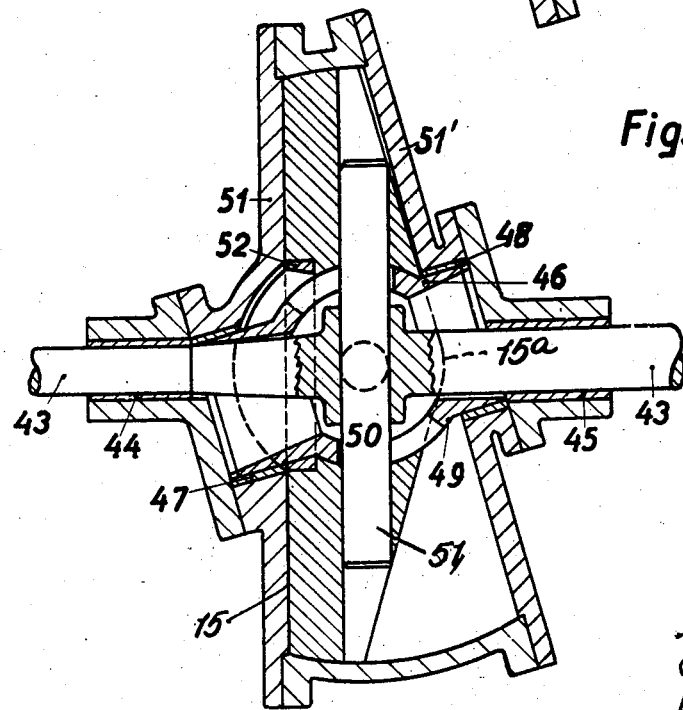

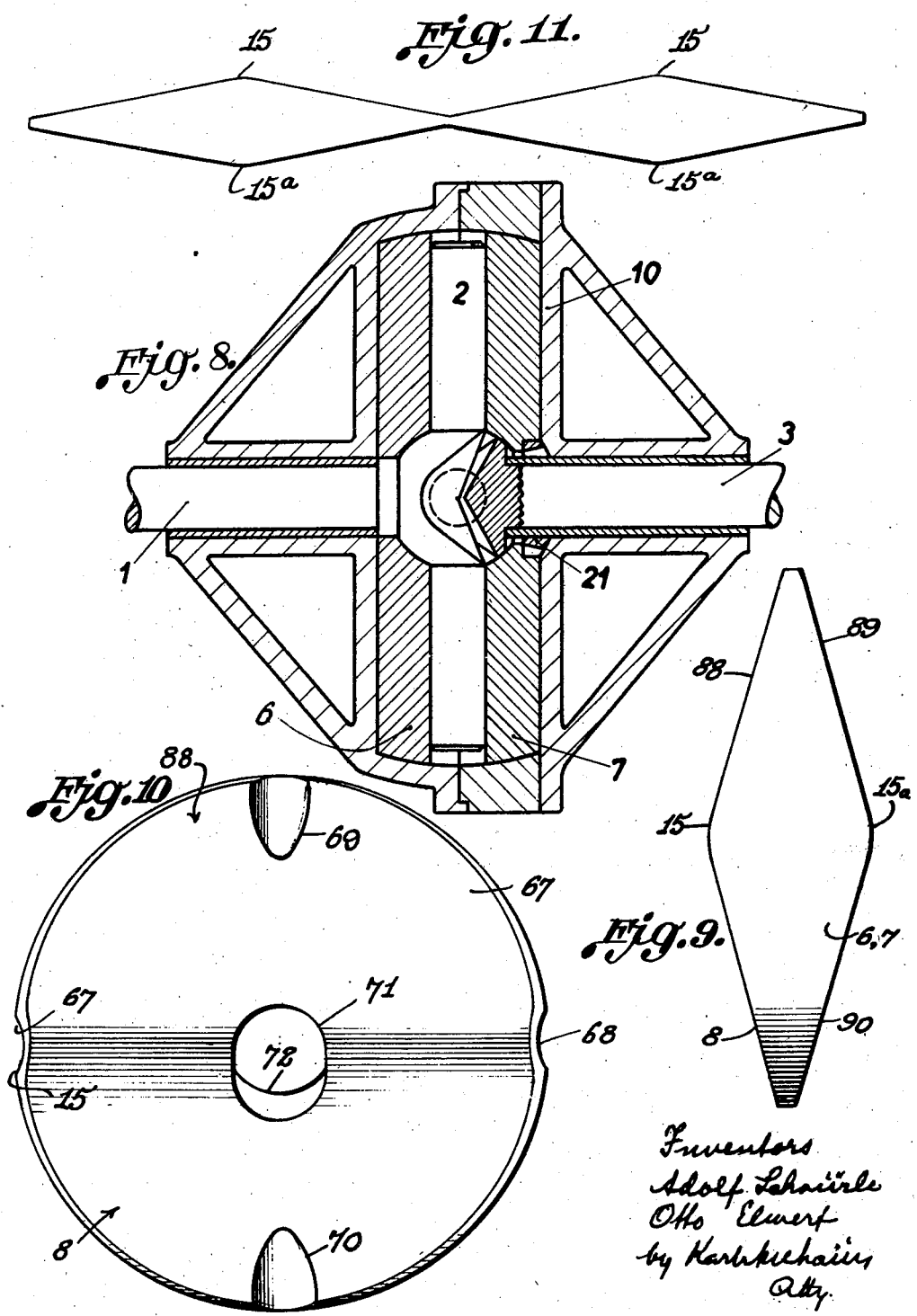

1,968,175

UNITED STATES PATENT OFFICE 1,968,175

ROTARY MACHINE

Adolf Schnürle, Stuttgart-Cannstatt, and Otto Elwert, Boblingen, Germany

Application January 31, 1933, Serial No. 654,410
In Germany February 5, 1932

10 Claims. (Cl. 103—134)

Our invention relates to rotary machines in which a piston member performs an angular or oscillatory movement, like a swash plate. In such machines, as designed heretofore, two more members are required for cooperation with the swashplate piston and such members are arranged in a spherical casing and equipped with spherical faces for fitting the casing. Such a machine requires not less than three members in the casing all of which members must be shaped in conformity with the spherical inner walls of the casing, and therefore the machine is complicated, liable to give trouble, and expensive. It is an object of our invention to improve a machine of the type aforesaid so that it requires only the swash-plate piston but not the members cooperating therewith. To this end, we provide a casing and in the casing we mount two shafts whose axes extend at an angle to each other. On the shafts, we arrange pins at right angles to the axis of the corresponding shaft. The casing has two plane, not spherical, end plates and a swashplate piston which is arranged intermediate the end plates and connected to the pins of the shafts so as to form therewith a universal joint. On either side of the piston, we provide a ridge which ridges permanently engage with, and make a tight fit on, the corresponding end plate of the casing. The sides of the piston are made with a pair of faces per side, and the faces merge into the ridge at their inner ends and are inclined toward the central plane of the piston. The pairs of faces cooperate with the corresponding end plates so as to form suction and delivery, or inlet and outlet, chambers with the end plates as the piston performs its swash-plate or oscillatory movement.

The space enclosed by a given face of the swashplate piston and the adjacent end plate of the casing, is alternately enlarged and reduced, so that the space acts as a suction and delivery chamber if the machine is operated as a pump, or as an inlet and outlet chamber if the machine is operated as an engine.

The chambers, whatever they may be, are separated by the tightly fitting ridges on the piston. In the old engines referred to, the chambers are formed between the two members and the piston, and not between the piston and the plane end plates of the casing, as in our machine.

It will be understood that the rim of the swashplate piston is not of equal width throughout but, flattened out, presents a wavy appearance, the crests of the waves being the points where the ridges intersect with the perimeter of the piston.

According to our invention, the casing is equipped with a member which is inserted between its plane end plates and has a spherical inner face which the, also spherical, rim of the piston engages as the piston performs its swash-plate movement. The inlet and outlet ports of the machine or engine are formed in the member and are controlled by the wavy rim of the piston.

The end plates of the casing and the ridges of the piston may extend in parallel relation to each other but a particularly favorable arrangement is provided by arranging the end plates converging at the angle included by the shafts, and the ridges at right angles to each other. In this case, only a single port is required per pair of chambers at opposite sides of the piston, and both ports are controlled by the rim of the piston.

Our machine may be operated as an engine, a pump, a blower, a compressor, a gas or liquid meter, and for many other purposes.

By way of example, it will be described and illustrated as a blower for conveying air. Such a blower on account of its operation is particularly suitable for scavenging and supercharging internal combustion engines.

As not only the Cardan pins themselves but all other diameters of the swash-plate piston rotate only in a definite plane which is fixed in space, i. e. only about a fixed axis, inertia forces of any appreciable amount will not occur at the swashplate piston, and the machine may therefore be operated at very high speeds.

In the drawings affixed to this specification and forming part thereof machines adapted to operate as a blower for air and embodying our invention, are illustrated diagrammatically by way of example.

In the drawings

Fig. 1 is a section on the plane of the axes of the two shafts, showing a machine whose casing has parallel end plates, Fig. 2 is a diagram showing ports in the casing of the machine illustrated in Fig. 1, Fig. 3 is a section on the plane of the axes of the two shafts, showing a machine whose piston has ridges extending at right angles to each other, and whose casing has converging end plates, Fig. 4 is a section on the line IV—IV in Fig. 3, Fig. 5 is a diagram showing a port in the casing of the machine illustrated in Figs. 3 and 4, Fig. 6 is a section on the plane of the axes of the two shafts, showing a machine whose casing has parallel end plates, like that of the machine illustrated in Fig. 1, but in which one of the shafts only is solid while the other shaft is hollow for its reception, with the swash-plate piston at right angles to the position shown in Fig. 1, Fig. 7 is a section showing the machine illustrated in Figs. 3 to 5 equipped with the solid and hollow shafts as shown in Fig. 6, Fig. 8 is a section of the machine illustrated in Fig. 1, Fig. 9 is an end elevation of a swash-plate piston, whose ridges extend in parallel, as in the piston illustrated in Fig. 1, Fig. 10 is an elevation of the piston, viewed from the left in Fig. 9, and Fig. 11 shows the rim or perimeter of the piston flattened out and drawn to half the scale of Figs. 9 and 10.

Referring now to the drawings, and first to Figs. 1, 2 and 8, 1 is one of the shafts of the universal or Cardan joint, to which pins 2 are rigidly connected, and 3 is the other shaft, to which pins 4 are rigidly connected. The shafts are mounted to rotate in the end plates 9 and 10 of a casing 13, 14 and by way of example a bearing sleeve 5 is shown for the shaft 3 in the end plate 10 at the right. It is understood, however, that any other means, such as antifriction bearings of any type, may be provided for one or both shafts, if desired.

The swash-plate piston is divided into two halves 6 and 7 which may be connected by screws (not shown) or the like. The piston 6, 7 connects the pins 2 and 4 of shafts 1 and 3 in the manner of a universal or Cardan joint.

The design of the piston 6, 7 will be better understood from Figs. 9 to 11 in which the piston is shown as an undivided member for the sake of simplicity. The ridges 15 and 15a on opposite sides of the piston extend in parallel relation to each other. The ridges are shown as cylindrical faces curved about the axes of pins 2, 2, and in central position with respect to the piston. 8 and 88 are the faces at the left of the piston, which merge into the ridge 15 and are inclined toward the central plane of the piston, and 89 and 90 are the faces at the right of the piston which merge into the ridge 15a at the opposite side of the piston. The ridges are parts of cylinders and make a tight fit on the end plates they cooperate with while the piston 6, 7 rotates and performs its swash-plate movement. By reference to Fig. 1, it will be found that the faces 8 and 88 and the ridge 15 at the left of the piston cooperate with the end plate 9, while the faces 89 and 90 and the ridge 15a at the right of the piston cooperate with the end plate 10 to form chambers with the plates, as will be described. The ends of the bores 67 and 68 for the pins 2 on the shaft 1, and the ends of the bores 69 and 70 for the pins 4 on the shaft 3, are visible in Fig. 10. The inner end of the shaft 1 is admitted through an elongated hole 71 in the ridge 15, and the inner end of the shaft 3 is admitted through a similar hole 72 in the ridge 15a. Fig. 11 shows the wavy appearance of the rim or perimeter of the piston, with the thickened portions 15, 15a where the ridges intersect the rim of the piston.

It will appear that the piston has two roof-shaped sides whose faces may be plane as shown, like the plane end plates 9 and 10, or of any other suitable configuration, for instance, stepped from the ridges 15, 15a, or concave, etc. The ridges are not necessarily parts of cylinders but may be curved otherwise.

The shaft 1 or the shaft 3 may be the driving shaft. When this shaft is rotated, the swash-plate piston 6, 7 rotates with it and its ridges 15, 15a slide on the end plates 9 and 10, while, the sides 8 and 88, 89 and 90 of the swash-plate piston 6, 7 perform strokes with respect to the end plates. The position of the swash-plate piston illustrated in Fig. 1 is a dead-centre position in which the volume of the chamber 11 at the bottom of the casing part 13 is a maximum, and that of the chamber 12 at the top is a minimum. Preferably, a slight clearance is provided, as shown for the chamber 12, for the reception of foreign substances which may be entrained with the air, and for making up for inaccuracies in the construction of the parts.

The swash-plate piston 6, 7 makes a tight fit with its perimeter on the spherical inner surfaces of the casing parts 13 and 14 and its perimeter is spherical so as to fit the inner surfaces.

As the swash-plate piston 6, 7 rotates, it oscillates about the pins 2. Two chambers are formed at both sides of the piston which are alternately enlarged and reduced in opposite directions. The stroke or swash-plate movement of the piston is effected by the shaft 3 with its pins 4. It will be understood that when the piston recedes from an end plate, it forms a suction, and if it advances toward an end plate, it forms a delivery, chamber with the plate, and that the chambers at opposite sides of the shafts 1 and 3 perform opposite functions, i. e., one of them is a suction, and the other is a delivery chamber. The opposite chambers must be separated, and this is effected by the ridges 15 and 15a which, as mentioned, are cylindrical faces curved about the axis of the pins 2, 2 on the shaft 1. When the piston 6, 7 rotates with the shaft 1, the ridges 15, 15a slide on the end plates 9 and 10 on which they make a tight fit, separating the opposite chambers and preventing short-circuiting of the fluid from one chamber to the other. The face 88 at the left and at the top of the piston 6, 7 operates in conformity with the face 90 at the right and at the bottom, and vice versa.

The width of the perimeter is not uniform, as shown in Fig. 11. By this varying width of the perimeter, inlet and outlet ports in the wall of the casing parts 13, 14 may be controlled as the piston 6, 7 rotates and performs its swash-plate or stroke movements.

Referring now to Fig. 2, this diagram shows the portion of the casing which appears in Fig. 1. The piston, as described, has ridges 15 and 15a which extend in parallel relation to each other, and the end plates 9, 10 are also arranged in parallel relation to each other and at right angles to the shaft 1. This arrangement requires separate inlet and outlet ports per pair of chambers at opposite sides of the piston, i. e., an inlet and an outlet port for the chambers which the faces 8 and 90 form with the end plates 9 and 10, and an inlet and an outlet port for the chambers which the faces 88 and 89 form with the end plates, four ports in all. The piston is shown in dotted lines in its dead-centre position. The shafts 1 and 3 are indicated only by heavy black lines. When the shafts rotate as shown for the shaft 3 by the arrow in Fig. 2, 16 is an inlet port in the part 13, and 17 is an outlet port in the part 14 of the casing. The two ports 16 and 17 are in that portion of the casing which is at the rear in Figs. 1 and 2. Two similar ports (not shown) are arranged in the portion which is at the front. In the dead-centre position shown, all ports are closed by the wider portions of the piston rim at its points of intersection with the ridges 15 and 15a. When the piston rotates from this position, its narrower portions register with the ports and expose them. The ports are also exposed on account of the swash-plate movement of the piston.

By this individual control on opposite sides of the piston, individual operation is possible with respect to the kind, pressure, quantity and use of the medium to be conveyed.

For its oscillation about the pins 2, the piston 6, 7 requires a recess 19 for the shaft 1 which may be closed by means such as the hemispherical boss 20 on the shaft 1. This prevents short-circuiting of suction and pressure chambers.

At the right, where the shaft 3 projects from the inner face of the end plate 10 at an angle thereto, a spherical portion 21 is arranged at the side of the piston 6, 7 which tightly fits in a recess of the end plate 10. A similar member might obviously also be arranged at the left side of the piston 6, 7.

The operation of the blower illustrated in Figs. 1 and 2 corresponds to that of a single-cylinder, double-acting reciprocating pump. A perfectly uniform delivery is effected by the blower illustrated in Figs. 3, 4 and 5. In this piston, the ridges 15 and 15a extend at right angles to each other, as will appear from a comparison of Figs. 3 and 4. The ridge 15 is a cylinder whose axis is the axis of the pins 23, 23, corresponding to the pins 2, 2 in Fig. 1, but the ridge 15a is a cylinder whose axis is the axis of the pins 25, 25 corresponding to the pins 4, 4 in Fig. 1. In Fig. 3 the axis of the ridge 15 is in the plane of section, and the axis of the ridge 15a is at right angles thereto. In Fig. 4, the axis of ridge 15 is at right angles to the plane of section, and the axis of ridge 15a is in the plane of section. The rim or perimeter of a piston whose ridges extend at right angles to each other, differs from that shown in Fig. 11 in that the thickened portions where the ridges intersect the rim, are alternately at opposite sides of the piston, as will readily be understood without illustration. The end plates 28 and 29 are not parallel to each other but converge at an angle which is equal to the angle included by the axes of the shafts 22 and 24. The working strokes of one side of the piston are staggered for 90° with respect to those of the other side so that both sides together yield absolutely uniform delivery. This is effected by separating the suction and pressure chambers on one side along one of the Cardan pins, and along the other pin at the other side. The operation on each side of the piston is the same as in Figs. 1, 2 and 8.

The end plates 28 and 29 support the shafts 22 and 24 at right angles to the corresponding side plates. The operation of the piston 26, 27 with respect to the adjacent end plates is the same at opposite sides of the piston. One half of the air pressures on opposite sides of the piston is balanced. There are no free axial forces during the stroke or swash-plate movement of the piston. Such forces occur only for short periods at the sides of the piston when a compression stroke changes into a suction stroke. These forces may be absorbed by thrust bearings (not shown) for the shafts.

The inlet and outlet ports are controlled by the swash-plate movement, and the rotation of the piston and by the varying width of the perimeter wall of the piston in contact with the inner perimeter of the casing.

As mentioned, the arrangement of the inlet and outlet ports is much simplified in a machine of the type just described. Instead of two ports per pair of chambers, and four ports in all, as in the type illustrated in Figs. 1 and 2, the machine illustrated in Figs. 3 to 5 requires only one port per pair and two ports in all. Fig. 5 shows one of the ports, 30, which alternately serves as an inlet and as an outlet port. If the piston 26, 27 is in the position shown in dotted lines, and the shaft 22 rotates in the direction of the arrow, the port 30 serves as an inlet port. The opposite port which in this position serves as an outlet port, is above the plane of section. The ports are controlled by the rim of the piston in the manner described so as to be the inlet and the outlet port for the chambers of every pair, as required, and the separate inlet and outlet ports illustrated in Fig. 2 are dispensed with.

At the left side, the recess in the piston 26, 27 for the shaft 22 is closed, for instance, by the spherical boss 31 on shaft 22. At the right, a fixed spherical member 33 is connected to the bearing sleeve 32 of shaft 24. The last-mentioned modification is not shown in Fig. 4, for the sake of clearness. In Fig. 4, the bosses on the shafts make a tight fit at both sides.

It will appear from Figs. 1, 2 and 8, and from Figs. 3 to 5, that the swash-plate piston would be guided properly between the end plates of the casing if one of the two shafts were omitted. Instead of the omitted shaft, the swash-plate piston can be guided by the side walls of the casing or by bearings in the side plates. The shaft which is still present, may be supported as the driving shaft only in one end plate of the casing at one side of the swash-plate piston, or it may be supported in both end plates. Preferably, step bearings (not shown) are provided on the Cardan pins for centering the swash-plate piston.

Another possibility is making one of the shafts hollow, with the other shaft centrally arranged in the hollow shaft, and the pin on the solid shaft extending radially through the hollow shaft.

Referring to Fig. 6, a blower adapted to operate in conformity with Figs. 1, 2 and 8 is shown, with the piston 41, 42 at 90 degrees to the position in Fig. 1, and in section along the pins 34 whose axes are the axes of the cylindrical ridges 15 and 15a. The through shaft 35 is supported in bearings 36 at the end plates of the casing. Its single Cardan pin 37 extends through a slot in the hollow shaft 38 which is mounted to rotate in bearings 39 and 40 in the end plates and is equipped with the pins 34. The pins 34 and 37 are connected by the divided swash-plate piston 41, 42.

Fig. 7 shows a blower of the type illustrated in Figs. 3 to 5, equipped with a hollow shaft 46. The through shaft 43 is mounted in bearing sleeves 44 and 45 in the end plates 51, 51' while the hollow shaft 46 is mounted in bearings 47 and 48 and supported axially. The hollow shaft 46 is equipped with a spherical portion 49 to permit relative movement of the hollow shaft and the swash-plate piston about the pins 50, and for packing the hollow shaft. At the left, where the hollow shaft 46 penetrates through the end plate 51 at an inclined angle thereto, the chambers are separated by a spherical member 52 at the side of the piston the ridge 15a curved about the axis of pins 50, and the ridge 15 curved about the axis of pins 51.

The efficiency of the blower, engine etc., is high. It has large inlet and outlet sections. The flow is uniform and without abrupt changes of direction. The packing faces of the swashplate piston and their effective faces which are accessible to the pressure of the driving or conveyed medium, do not require lubrication and are not subjected to wear or friction. As the swash-plate piston has four stroke chambers, the machine is comparatively small and cheap.

We wish it to be understood that we do not desire to be limited to the exact details of construction shown and described for obvious modifications will occur to a person skilled in the art.

We claim:—

1. In a rotary machine, a casing, two shafts mounted to rotate in said casing about axes extending at an angle to each other, pins on said shafts arranged at right angles to the axis of the corresponding shaft, two plane end plates on said casing, a swash-plate piston arranged intermediate said end plates and connected to said pins so as to form therewith a universal joint, a ridge on either side of said piston in permanent engagement with the corresponding end plate, and a pair of faces on either side of said piston which merge into the corresponding ridge at their inner ends and are inclined toward the central plane of said piston, in cooperation with the end plates corresponding to the respective pairs of faces.

2. In a rotary machine, a casing, two shafts mounted to rotate in said casing about axes extending at an angle to each other, pins on said shafts arranged at right angles to the axis of the corresponding shaft, two plane end plates on said casing, a swash-plate piston arranged intermediate said end plates and connected to said pins so as to form therewith a universal joint, a central ridge on either side of said piston in permanent engagement with the corresponding end plate, and a pair of faces on either side of said piston which merge into the corresponding ridge at their inner ends and are inclined toward the central plane of said piston, in cooperation with the end plates corresponding to the respective pairs of faces.

3. In a rotary machine, a casing, two shafts mounted to rotate in said casing about axes extending at an angle to each other, pins on said shafts arranged at right angles to the axis of the corresponding shaft, two plane end plates on said casing, a swash-plate piston arranged intermediate said end plates and connected to said pins so as to form therewith a universal joint, a cylindrical ridge on either side of said piston in permanent engagement with the corresponding end plate, and a pair of faces on either side of said piston which merge into the corresponding ridge at their inner ends and are inclined toward the central plane of said piston, in cooperation with the end plates corresponding to the respective pairs of faces.

4. In a rotary machine, a casing, two shafts mounted to rotate in said casing about axes extending at an angle to each other, pins on said shafts arranged at right angles to the axis of the corresponding shaft, two plane end plates on said casing, a swash-plate piston arranged intermediate said end plates and connected to said pins so as to form therewith a universal joint, a ridge on either side of said piston in permanent engagement with the corresponding end plate, and a pair of plane faces on either side of said piston which merge into the corresponding ridge at their inner ends and are inclined toward the central plane of said piston, in cooperation with the end plates corresponding to the respective pairs of faces.

5. In a rotary machine, a casing, two shafts mounted to rotate in said casing about axes extending at an angle to each other, pins on said shafts arranged at right angles to the axis of the corresponding shaft, two plane end plates on said casing, a member inserted between said plane end plates and having a port, a spherical face on the inner side of said member, a swash-plate piston arranged intermediate said end plates and connected to said pins so as to form therewith a universal joint, a spherical face on the rim of said piston engaging said spherical face on the member so as to control said port, a ridge on either side of said piston in permanent engagement with the corresponding end plate, and a pair of faces on either side of said piston which merge into the corresponding ridge at their inner ends and are inclined toward the central plane of said piston, in cooperation with the end plates corresponding to the respective pairs of faces.

6. In a rotary machine, a casing, a hollow shaft mounted to rotate in said casing, a solid shaft extending through said hollow shaft and also mounted to rotate in said casing, said shafts being arranged to rotate about axes extending at an angle to each other, pins on said hollow shaft arranged at right angles to the axis of the hollow shaft, pins on said solid shaft arranged at right angles to the axis of the solid shaft and extending through said hollow shaft, two plane end plates on said casing, a swash-plate piston arranged intermediate said end plates and connected to said pins so as to form therewith a universal joint, a ridge on either side of said piston in permanent engagement with the corresponding end plate, and a pair of faces on either side of said piston which merge into the corresponding ridge at their inner ends and are inclined toward the central plane of said piston, in cooperation with the end plates corresponding to the respective pairs of faces.

7. In a rotary machine, a casing, two shafts mounted to rotate in said casing about axes extending at an angle to each other, and into recesses in said piston, means on said shafts for making a tight fit in said recesses, pins on said shafts arranged at right angles to the axis of the corresponding shaft, two plane end plates on said casing, a swash-plate piston arranged intermediate said end plates and connected to said pins so as to form therewith a universal joint, a ridge on either side of said piston in permanent engagement with the corresponding end plate, and a pair of faces on either side of said piston which merge into the corresponding ridge at their inner ends and are inclined toward the central plane of said piston, in cooperation with the end plates corresponding to the respective pairs of faces.

8. In a rotary machine, a casing, two shafts mounted to rotate in said casing about axes extending at an angle to each other, pins on said shafts arranged at right angles to the axis of the corresponding shaft, two plane end plates on said casing, a swash-plate piston arranged intermediate said end plates and connected to said pins so as to form therewith a universal joint, a ridge on either side of said piston in permanent engagement with the corresponding end plate, said ridges and end plates extending in parallel relation to each other, and a pair of faces on either side of said piston which merge into the corresponding ridge as their inner ends and are inclined toward the central plane of said piston, in cooperation with the end plates corresponding to the respective pairs of faces.

9. In a rotary machine, a casing, two shafts mounted to rotate in said casing about axes extending at an angle to each other, pins on said shafts arranged at right angles to the axis of the corresponding shaft, two plane end plates on said casing, a member inserted between said plane end plates and having an inlet and an outlet port, a spherical face on the inner side of said member, a swash-plate piston arranged intermediate said end plates and connected to said pins so as to form therewith a universal joint, a spherical face on the rim of said piston engaging said spherical face on the member so as to control said inlet and outlet ports, a ridge on either side of said piston in permanent engagement with the corresponding end plate, said ridges extending at right angles to each other, and said end plates including an angle with each other which is equal to the angle at which said shafts extend to each other, and a pair of faces on either side of said piston which merge into the corresponding ridge at their inner ends and are inclined toward the central plane of said piston, in cooperation with the end plates corresponding to the respective pairs of faces.

10. In a rotary machine, a casing, two shafts mounted to rotate in said casing about axes extending at an angle to each other, pins on said shafts arranged at right angles to the axis of the corresponding shaft, two plane end plates on said casing, a member inserted between said plane end plates and having an inlet and an outlet port per pair of chambers at opposite sides of said piston, a spherical face on the inner side of said member, a swash-plate piston arranged intermediate said end plates and connected to said pins so as to form therewith a universal joint, a spherical face on the rim of said piston engaging said spherical face on the member so as to control said inlet and outlet ports, a ridge on either side of said piston in permanent engagement with the corresponding end plate, said ridges extending at right angles to each other, and said end plates including an angle with each other which is equal to the angle at which said shafts extend to each other, and a pair of faces on either side of said piston which merge into the corresponding ridge at their inner ends and are inclined toward the central plane of said piston, in cooperation with the end plates corresponding to the respective pairs of faces.

ADOLF SCHNÜRLE.
OTTO ELWERT.